United States Patent [19]

Gotoh

[11] Patent Number: 4,987,193
[45] Date of Patent: Jan. 22, 1991

[54] PROCESS FOR PRODUCING UNSATURATED COPOLYMERS

[75] Inventor: Shiroh Gotoh, Yokkaichi, Japan

[73] Assignee: Mitsubishi Petrochemical Company Limited, Tokyo, Japan

[21] Appl. No.: 524,856

[22] Filed: May 18, 1990

[30] Foreign Application Priority Data

May 25, 1989 [JP] Japan ................................. 64-132353

[51] Int. Cl.$^5$ .................. C08F 297/06; C08F 297/08; C08F 236/20
[52] U.S. Cl. .................................... 525/313; 525/314; 526/336
[58] Field of Search ............................... 525/313, 314

[56] References Cited

FOREIGN PATENT DOCUMENTS 219166 4/1987 European Pat. Off. .
59-155416 9/1984 Japan .
60-032834 2/1985 Japan .
62-115007 5/1987 Japan .

Primary Examiner—Carman J. Seccuro
Attorney, Agent, or Firm—Oblon, Spivak, McClelland, Maier & Neustadt

[57] ABSTRACT

An unsaturated copolymer of propylene and the branched diene which is 6-methyl-1,6-octadiene and/or 7-methyl-1,6-octadiene, and optionally, ethylene is produced by a two-step process wherein in a first polymerization step homopolymerization of propylene is conducted until the propylene polymer amounts to 0.01 to 10% by weight of the total and final copolymer, and in a second polymerization step the random copolymerization of propylene, 6-methyl-1,6-octadiene and/or 7-methyl-1,6-octadiene, and optionally, ethylene is then conducted as a continuation of the first step polymerization, whereby a copolymer of a specified characteristics is produced.

11 Claims, No Drawings

PROCESS FOR PRODUCING UNSATURATED COPOLYMERS

BACKGROUND OF THE INVENTION

1. Field of the Invention

The present invention relates to a process for producing a random copolymer which comprises propylene and a specific diene as essential components and has an unsaturated carbon-carbon bond.

More particularly, the present invention relates to a process for preparing a novel propylene-based random copolymer which has excellent formability/moldability, heat resistance, transparence, impact resistance and stiffness and has reactivities such as crosslinking ability, paintability, and printability.

2. RELATED ART

It is well known that the homopolymers or copolymer of propylene have excellent properties, whereby their applications to a variety of fields have been developed.

On the other hand, these polymers are essentially saturated hydrocarbons in nature and have poor chemical reactivities. Consequently, they are accompanied by problems such as limitation in grafting or crosslinking and distinguished inferiority in adhesion, paintability, printability and the like which require polar groups.

Various inventions have been proposed for the purpose of overcoming these disadvantages. Among these inventions the followings are particularly related to the present invention: Japanese Patent Application Laid-Open Publication Nos. 165907/80, 30414/81, 36508/81, 115007/87 and 115008/87. These inventions relate to the copolymerization of propylene and a 1,4-diene. The product is valuable as a reactive polypropylene because of an unsaturated double bond in its side chains.

However, one of the problems of these inventions is, so far as the present inventor knows, that an expensive 1,4-diene must be used in a large amount as the 1,4-diene does not necessarily have a high copolymerizability. They have also a problem in that a 1,4-diene having a low reactivity must be charged into a polymerization system in a large amount, so that the catalyst activity is low, and thus the cost of the catalyst tends to be high.

Further, in Japanese Patent Application Laid-Open Publication No. 36508/81 is disclosed a process for prepolymerizing propylene in the copolymerization of a 1,4-diene and propylene. The process had, so far as the present inventor knows, a problem in that a gel of a crosslinked polymer which is insoluble in decalin at 35° C. was often produced due to the presence of the 1,4-diene. In addition, a serious problem in the polymerization operation was that when prepolymerization and polymerization are conducted in one reactor, the 1,4-diene does not necessarily have a high copolymerizability, so that a large amount of the 1,4-diene must be added within a short period of time after prepolymerization in order to increase the concentration of the 1,4-diene.

Also, Japanese Patent Application Laid-Open Publication No. 155416/84 discloses a process for preparing a block copolymer which has a non-conjugated branched diene as an essential component. However, so far as the present inventor knows, the process had a problem of low transparence of the product notwithstanding the good impact resistance. Moreover, the diene utilized in examples had low polymerizability per se and copolymerizability and thus required improvement in both the cost, especially that involved in catalysts used, and the operation, especially that which entails supplementing a large amount of the diene.

SUMMARY OF THE INVENTION

The present invention provides a solution to the problems described above. An object of the present invention is to provide a process for rationally preparing a reactive polypropylene having an unsaturated double bond in side chains thereof.

Thus, the process for producing an unsaturated copolymer according to the present invention comprises the improvement in the copolymerization of propylene and 6-methyl-1,6-octadiene and/or 7-methyl-1,6-octadiene, and optionally, ethylene, which improvement comprises, in a first polymerization step, the polymerization of propylene over a catalyst conducted in the presence of neither ethylene, 6-methyl-1,6-octadiene nor 7-methyl1,6-octadiene until the propylene polymer amounts to 0.01 to 10% by weight of the total copolymer to be produced, and, in a second polymerization step, the random copolymerization of propylene, 6-methyl-1,6-octadiene and/or 7-methyl-1,6-octadiene, and if necessary, ethylene conducted in the presence of the propylene polymer produced and at least a part of the activity of the catalyst used to produce a copolymer defined as follows:

(1) essentially consisting of the components of
  (a) 84 to 99.5 mole % of a unit derived from propylene,
  (b) 0 to 15 mole % of a unit derived from ethylene, and
  (c) 0.5 to 15 mole % of a unit derived from 6-methyl-1,6-octadiene and/or 7-methyl-1,6-octadiene;
(2) soluble in decalin at 135° C. and substantially free of a gel of a crosslinked polymer; and
(3) having a MFR (at 230° C. under a load of 2.16 kg) of 0.01 to 500 g/10 min.

The copolymer obtained by the present invention can be used by taking advantage of its reactivity for a variety of applications such as paintable exterior or interior parts of automobiles and electric domestic appliances and exterior sheathing material thereof, containers, of surfaces that are printable, such as bottles, films, sheets, packaging materials, crosslinked foams, heat resistant coating materials for electric wire, and reinforcing materials of rubber products. The copolymer can be also applied to the introduction of various functional groups or the grafting of polymers.

DETAILED DESCRIPTION OF THE INVENTION

[I] Catalyst for polymerization

The random copolymer of the present invention is generally prepared by polymerizing the given monomers in the presence of a Ziegler type stereoregular catalyst which is made up from a reduced highly active titanium trichloride composition and a dialkylaluminium halide or a catalyst which is produced from a solid titanium catalyst component comprising titanium, magnesium, halogen and an electron donor as the essential components and an organoaluminium compound.

In particular, it is preferable to use a catalyst which is made up from a solid titanium catalyst component comprising titanium, magnesium, halogen and an electron donor as the essential components and an organic aluminium compound because, by their use, only a low level of soluble polymers are produced as by-products.

Solid catalyst component

Appropriate examples of the highly active titanium trichloride composition from which the aforementioned Ziegler type stereoregular catalyst is made are (i) composition in which titanium tetrachloride is reduced with an organoaluminium compound or the like, treated with a complex forming agent, and activated by thermal treatment, grinding treatment or chemical treatment with a Lewis acid such as titanium tetrachloride, and (ii) a composition which is deposited from titanium trichloride liquefied with a complex forming agent and then activated preferably by chemical treatment with a Lewis acid such as titanium tetrachloride. Such reduced highly active titanium trichloride compositions are described in Japanese Patent Application Laid-Open Publication Nos. 34478/72, 64170/73, 151787/78, 40348/77, 138083/77, 49996/77, 140922/77 and 147590/77.

Examples of the dialkylaluminium halide are diethylaluminium chloride, diisobutylaluminium chloride, di-n-propylaluminium chloride, and di-n-hexylaluminium chloride. The Ziegler type stereoregular catalyst comprising these two components may contain, in addition to the aforementioned two components as the third component, a variety of compounds for various purposes such as the improvement of stereoregularity. Among these compounds which may be added to the composition, those which are particularly preferred in the present invention are electron donors such as ethers, amines, ketones, carboxylic acid esters, carboxylic acid amides, trialkylphosphines, triarylphosphines, triarylphosphites, phosphoric amides, and silicates.

On the other hand, as the solid titanium catalyst component which is preferably used in the present invention and comprises as the essential components titanium, magnesium, halogen and an electron donor, mention can be made of a catalyst component which is formed from a magnesium dihalide as a raw material. Preferred ones among such catalyst components are described, for example, in Japanese Patent Application Laid-Open Publication Nos. 80406/84, 145206/84, 197607/86, 204202/86, 211312/86, 213207/86, 213210/86, 213211/86, 254610/86, 266413/86, 271304/86, 72702/87, 187706/87, 187707/87, 236805/87, 236806/87, 246906/87, 257906/87, 297303/87, 39901/88, 83105/88, 89513/88, 92615/88, 97605/88, 156806/88 and 156807/88.

Co-catalyst

Specific examples of the organoaluminium compounds used as a co-catalyst of the solid titanium catalyst component that comprises as the essential components titanium, magnesium, halogen and an electron donor are compounds represented by the formula $$R^3{}_{3-n}AlX_n \text{ or } R^4{}_{3-m}Al(OR^5)_m$$

wherein:
$R^3$, $R^4$ and $R^5$ may be the same or different and represent hydrocarbyl groups having 1 to 20 carbon atoms or a hydrogen atom; X represents a halogen atom; n and m denote numbers in the ranges of $0 \leq n \leq 2$ and $0 \leq m \leq 1$.

Specific examples are:
(i) trialkylaluminiums such as trimethylaluminium, triethylaluminium, triisobutylaluminium, trihexylaluminium, trioctylaluminium, and tridecylaluminium;

(ii) alkylaluminium halides such as diethylaluminium monochloride, diisobutylaluminium monochloride, ethylaluminium sesquichloride, and ethylaluminium dichloride;

(iii) dialkylaluminium hydrides such as diethylaluminium hydride and diisobutylaluminium hydride; and (iv) alkylaluminium alkoxides such as diethylaluminium ethoxide, diethylaluminium butoxide, and diethylaluminium phenoxide.

Another organometallic compound such as an alkylaluminium alkoxide represented by the formula $$R^7{}_{3-a}Al(OR^8)_a,$$

wherein: a is a number in the range of $1 \leq a \leq 3$, $R^7$ and $R^8$ may be the same or different and represent hydrocarbyl groups having 1 to 20 carbon atoms, can be used in combination with these organoaluminium compounds (i) to (iii). Examples of such combinations are a combination of triethylaluminium and diethylaluminium ethoxide, a combination of diethylaluminium monochloride and diethylaluminium ethoxide, a combination of ethylaluminium dichloride and ethylaluminium diethoxide, and a combination of triethylaluminium, diethylaluminium ethoxide and diethylaluminium chloride. These organometallic compounds are used without particular limitation in amount but are preferably in the ratio by weight of 0.5 to 1000 to the aforementioned solid catalyst component. In order to improve the stereoregularity of the polymer, electron donor compounds such as ethers, esters, and amines can be added to the components.

[II] Polymerization

Monomer Monomers to be polymerized in the present invention are propylene, 6-and/or 7-methyl-1,6-octadiene and, optionally, ethylene.

According to the present invention, these monomers are polymerized in a specific mode. More specifically, polymerization is carried out after dividing these monomers into those for the prepolymerization step and for the main polymerization step comprising random copolymerization. Details of the polymerization are described hereinafter. It is also described hereinafter that, in these steps in addition to the specified monomers, a small amount of a copolymer which is copolymerizable with these monomers can be further copolymerized.

The dienes used in the present invention are 6-methyl-1,6-octadiene and/or 7-methyl-1,6-octadiene. 7-methyl-1,6-octadiene is preferable.

If these dienes are used, the advantages of extraordinarily high copolymerizability with propylene and ethylene and of high polymerization activity per catalyst as compared with the other dienes such as 1,4-hexadiene, 4-methyl-1,4-hexadiene, 1,5-octadiene, divinylbenzene, and ethylidene-norbornene are obtained.

Methyl-1,6-octadienes having such advantages have a 1,2-addition structure in a copolymer. Therefore the resulting copolymer has a reactivity owing to the unsaturated double bond present in the side chain. Prepolymerization One of the features of the present invention is the polymerization of propylene in the presence of neither 6-methyl-1,6-octadiene and/or 7-methyl-1,6-octadiene (both of which are sometimes referred to hereinafter as a single abbreviation: a branched 1,6-diene) nor ethylene as the first polymerization step prior to the random copolymerization. This can not only reduce extensively the amount of polymer by-products which are generally low crystalline or low molecular weight polymers, but also improve the bulk density of the polymer product. The activity can be also improved. Unexpectedly, since there is practically no formation of the crosslinked polymer in gel form which is insoluble in decalin at 135° C. and tends to be produced in the polymerization of a 1,4-diene, formed or molded products of excellent appearance can be obtained.

A number of references relating to techniques of prepolymerization with propylene are known, whereas the technique of producing a copolymer containing the branched 1,6-diene as an essential component is not known. It was thus quite unexpected that the effect of preventing the production of crosslinked polymers was exhibited in the copolymerization of propylene, (and optionally ethylene) and the branched 1,6-diene.

The proportion of the prepolymer, i.e. the homopolymer of propylene, to the total copolymer produced after the practice of a second step polymerization is in the range of 0.01 to 10% by weight, preferably 0.1 to 7% by weight, most preferably 0.5 to 5% by weight. Particularly when the prepolymer is in a proportion of 1% by weight or less of the total copolymer, it functions effectively for controlling the rapid decrease of the melting point due to the random copolymerization. When the prepolymer is in a proportion of 5% by weight or less, it shows extensive effect on improving the balance between the rigidity and impact resistance of the molded product. If the prepolymer is in a proportion of less than 0.01% by weight, it is not practical because of the lack of the advantages described above. If the prepolymer is in a proportion exceeding 10% by weight, the advantageous effects are saturated, so that it is meaningless to increase further the ratio of the prepolymerization. In addition, when the random copolymer has high comonomer contents, harmful influences such as reduction of the transparence of the formed/molded product, poor appearance or the like may be caused due to the fact that the compatibility between the prepolymer and the random copolymer is not always good. Thus, the presence of an excessive amount of the prepolymer is not desirable.

It is permissible to conduct the prepolymerization in the presence as a comonomer of a 1-olefin having 4–12 carbon atoms such as butene-1,4-methylpentene-1, vinylcyclohexane, styrene or the like.

The polymerization temperature during the prepolymerization is in the range of 0 to 75° C., preferably 10 to 65° C., most preferably 20 to 55° C. The temperature is preferably the same as or lower (by i.e. 5 to 100° C., preferably by 10 to 60° C.) than the temperature of the random copolymerization which will succeed to the prepolymerization. Particularly when the proportion of the prepolymer to the total copolymer produced is low, the prepolymerization is preferably conducted at a low temperature of 50° C. or less.

The partial pressure of propylene is in the range of 0.01 to 20 atm, preferably 0.05 to 5 atm, particularly 0.1 to 2 atm, but it is not necessarily limited to the above described ranges provided that the proportion of the prepolymer to the total polymer and the prepolymerization temperature are within the above described ranges.

Further, it is also possible to control the molecular weight or the copolymerization activity by adding hydrogen to the prepolymerization, if necessary.

It is practical to conduct the prepolymerization in the reactor in which the random copolymerization that succeeds the prepolymerization is carried out, but it is not necessarily limited to such a fashion. For instance, prepolymerization is carried out in a certain vessel, and the prepolymerization mixture thus produced is then introduced into a reactor for random copolymerization. Alternatively, the prepolymer/catalyst after prepolymerization can be subjected to procedures such as washing or drying before the random copolymerization is carried out on it.

Random Copolymerization

The process for preparing the copolymer according to the present invention comprises, after prepolymerization in the presence of the catalyst which has already been described in detail, conducting random copolymerization by mixing and contacting propylene, the branched 1,6-diene and, optionally, ethylene in the presence of the propylene polymer product and at least part of the activity of the polymerization catalyst in the first step. The quantitative ratio of the monomers in the random copolymer is not required to be constant with the passage of time. Thus, it is advantageous to supply the monomers at a constant ratio, and it is also possible to change the ratio of the monomers with the passage of time. One of the monomers, particularly the branched 1,6-dienes, can be added portionwise, taking into account the copolymerization ratio of the monomers.

As the branched 1,6-diene, one of 6-methyl-1,6-octadiene and 7-methyl-1,6-octadiene or a mixture thereof can be used. It is however preferable to use one of the branched 1,6-dienes, particularly 7-methyl-1,6-octadiene in order to control the reactivity.

Any of various modes of polymerization can be used, provided that the catalyst component and respective monomers are contacted efficiently. Specifically, the slurry method using an inert solvent or dispersant, the slurry method which uses substantially no inert solvent or dispersant and uses as the solvent or dispersant propylene and the branched 1,6-diene themselves, or the vapor phase method in which substantially no liquid solvent or dispersant is used and each monomer is substantially maintained in a gaseous state, can be used as the polymerization mode.

The polymerization in the second step is carried out in the presence of at least part of the activity of the polymerization catalyst in the first step. The phraseology "in the presence of at least part of the activity" means not only that the polymerization in the second step is carried out solely with the use of the polymerization activity of the catalyst used in the polymerization in the first step, but also that catalyst components such as the solid component and/or a co-catalyst, particularly a co-catalyst, used in the first step polymerization can be supplemented in the polymerization in the second step.

The polymerization condition varies depending on the processes to be used. The polymerization temperature is in the range of 30 to 100° C., preferably 40 to 90° C., particularly 50 to 80° C. The polymerization pressure is in the range of 0 to 45 kg/cm$^2$·G, preferably 1 to 40 kg/cm$^2$·G, particularly 2 to 36 kg/cm$^2$·G.

The molecular weight of the copolymer can be controlled with a variety of well known techniques. Practically it is most preferably controlled with hydrogen.

[III] Copolymer

(1) Composition

The copolymer obtained according to the present invention is a random copolymer having 84 to 99.5 mole % of a unit derived from propylene, 0 to 15 mole % of a unit derived from ethylene and 0.5 to 15 mole % of a unit derived from the branched 1,6-diene.

If the amount of the propylene unit is less than 84 mole %, the copolymer will be undesirably produced as a rubber-like substance because of excessive decrease of the crystallizability. On the other hand, if the amount of the propylene unit exceeds 99.5 mole %, the content of the branched 1,6-diene will decrease excessively, whereby the reactivity due to the unsaturated bond on the side chain which is the aim of the present invention cannot be sufficiently exhibited.

The amount of the branched 1,6-diene unit is represented by the sum of the units derived from 6-methyl-1,6-octadiene and 7-methyl-1,6-octadiene when the combination of both is used. If the amount of the branched 1,6-diene is less than 0.5 mole %, the objects of the present invention cannot be achieved. On the other hand, if the amount exceeds 15 mole %, the crystallizability of the copolymer will decrease excessively to an undesirable level.

The ethylene unit is optionally introduced in order to impart to the copolymer the required physical properties such as transparence, softness, and melting point. However, if the amount of the ethylene unit exceeds 15 mole %, the crystallizability of the copolymer will decrease excessively to an undesirable level. Thus, the preferred copolymer according to the present invention is a copolymer having 87 to 99.5 mole % of the propylene unit, 0 to 12 mole % of the ethylene unit and 0.5 to 10 mole % of the branched 1,6-diene unit, particularly 90 to 99 mole % of the propylene unit, 0 to mole % of the ethylene unit and 1 to 6 mole % of the branched 1,6-diene unit.

The random copolymer according to the present invention has a 1,2-addition structure of 1,6-octadiene. Thus, the random copolymer comprises the following structural units, in which the unit (Iii) derived from ethylene is not essential:

(i) Unit derived from propylene:

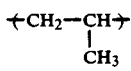

(ii) Units derived from 6-and/or 7-methyl-1,6-octadiene, in which one of $R^1$ and $R^2$ represents H, and the other represents $CH_3$:

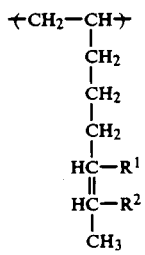

(iii) Unit derived from ethylene:

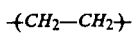

(2) Molecular Weight

The copolymer of the present invention has a molecular weight corresponding to the melt flow rate (MFR) measured at 230° C. under a load of 2.16 kg according to JIS K-6758 in the range of 0.01 to 500 g/10 min, preferably 0.02 to 200 g/10 min, particularly 0.05 to 50 g/10 min. If the MFR value is less than 0.01 g/10 min, forming or molding will be difficult. If the value of the MFR exceeds the above stated range, the mechanical properties will decrease greatly to an undesirable level.

(3) Melting Point

The copolymer according to the present invention has a melting point in terms of the peak temperature measured by DSC in the range of 100° C. to 160° C., preferably 110° C. to 158° C., particularly 120° C. to 155° C. If the melting point is less than 100° C., the heat resistance which is characteristic of propylene-based resins cannot be exhibited, and the copolymer will be obtained as an undesirable rubber-like substance.

(4) Crystallinity

The copolymer according to the present invention has a crystallinity measured by the X-ray diffraction method in the range of 20 to 60% by weight or more, preferably in the range of 30 to 55% by weight. If the crystallinity is less than 20% by weight, the heat resistance which is characteristic of propylene-based resins cannot be exhibited.

(5) Molecular-Weight Distribution

The molecular-weight distribution of the copolymer was obtained as the ratio of the weight average molecular weight to the number average molecular weight ($\overline{M}_W/\overline{M}_N$), in which these molecular weights were measured by diSSolVing the copolymer in o-dichlorobenzene at 140° C. and measuring by GPC (gel permeation chromatography). The molecular-weight distribution of the copolymer according to the present invention, $\overline{M}_W/\overline{M}_N$, is in the range of 2 to 15, preferably in the range of 3 to 10.

(6) Crosslinking

The copolymer according to the present invention is soluble in decalin at 135° C. and comprises substantially no gel of a crosslinked polymer. The content of the gel of the crosslinked polymer was determined on a sample which was obtained by cutting a sheet press-formed at 190° C. and having a thickness of 1 mm into a 3-mm square, dipping 1 g of the sample on a metal net having a 160 mesh was placed in decalin at 135° C. for 24 hours, and measuring the ratio of the weight of the copolymer remaining in the metal net after ample drying.

[IV] Utilization and Application of the Copolymer

It is possible to use the reactivity of the unsaturated copolymer obtained by the present invention for various applications.

Typical applications are as follows.

(1) Resin composition

The unsaturated copolymer obtained by the present invention can be worked into a composition which contains additional thermoplastic polymers according to necessity.

Examples of additional thermoplastic polymers include (i) homo- or mutual-copolymer resins of α-olefins such as ethylene, propylene, butene-1, pentene-1, and 4-methyl-1-pentene;

(ii) denaturation treatment products of these olefins including products obtained by denaturation by grafting an unsaturated organic acid or a derivative thereof, chlorination, sulfonation, styrenation, oxidation or the like;

(iii) copolymer resins of an α-olefin and a copolymerizable monomer other than the α-olefin such as an unsaturated organic acid or a derivative thereof, a vinyl ester, and an unsaturated organosilane compound and denaturation treatment products of these copolymers;

(iv) resins such as polystyrenes, acrylonitrilebutadiene-styrene resins (ABS), polyamides, polyesters, polyphenylene ethers, polycarbonates, polyvinyl chlorides or the like; styrene-butadiene-styrene block copolymers; styrene-isoprene block copolymers; and polymers in which unsaturated groups contained therein have been hydrogenated;

(v) rubbers such as ethylene-propylene rubbers (including EPDM), ethylene-1-butene rubbers (including terpolymer rubbers in which polyenes have been copolymerized), natural rubbers, polybutadiene rubbers, polyisoprene rubbers, styrene-butadiene rubbers (SBR), and butyl rubbers.

These thermoplastic polymers can contain one or more of the following additives added thereto;

(i) a variety of stabilizers, phenolic, sulfided, phosphorous, aminated or the like, such as an antioxidant, a thermal stabilizer, an ultraviolet absorber, and an antistatic agent;

(ii) inorganic fillers such as silica, mica, talc, calcium carbonate, carbon black, glass fibers, glass beads, carbon fibers, gypsum, clay, aluminium hydroxide, magnesium hydroxide, and titanium oxide;

(iii) coloring matters or pigments, flame-retarders, surface active agents, crosslinking suppressors or retarders or the like.

The content of the branched 1,6-diene in the composition so formulated is required to be in the range of 0.5 to 15 mole %, preferably 1 to 9.9 mole %.

(2) Laminated Film

The unsaturated copolymer obtained by the present invention itself can be used as a single-layer or multi-layer film. Particularly, a laminated film formed by laminating on at least one side of a base film of an olefin-based resin is one of the preferred films. Such a laminated film can be produced by laminating by a well-known method, the copolymer resin film according to the present invention with a base layer film which may be of a single layer structure or of a laminate structure, stretched or non-stretched. As the base layer film, either of a non-stretched film formed by the casting method or the inflation method or a stretched film formed by the sequential biaxially stretching method, the simultaneous biaxially stretching method or the uniaxially stretching method can be used. On one side or both sides of the base layer film prepared according to these methods, the copolymer resin film according to the present invention is laminated by a method such as the extrusion lamination method, the dry lamination method or the co-extrusion lamination method (intra-die or extra-die lamination methods). The laminated film thus obtained can be, if necessary, subjected to a stretching operation. While these forming methods are altered optionally depending on the uses of the laminated films or required capacities, a high level of printability or adhesion is exhibited in the film of the copolymer according to the present invention with any one of these methods.

The laminated film has a thickness in the range of 5 to 200 μm, preferably 10 to 100 μm. The resin layer laminated thereon can be a very thin layer so that the base layer will not be exposed on the surface, but ordinarily it has a thickness in the range of 0.1 to 100 μm, preferably in the range of 0.1 to 50 pm.

The laminate film thus obtained, while having the physical property characteristics of the olefin type polymer of the base resin, can be further endowed with improved properties which are not exhibited in the olefin-based polymers and are primarily derived from polar groups. Such further properties are improved adhesion, paintability, printability, antistatic properties, and the like. This is based on the fact that polar groups can be easily introduced on the surface of the laminate film by utilizing the reactivity of the carbon-carbon unsaturation in the side chain of the unsaturated copolymer resin on the laminate as a coating resin. In addition, the unsaturated copolymer resin in accordance with the present invention is capable of molecular crosslinking even when the resin is in the form of foam, and accordingly it is possible to manufacture a laminate film or sheet of the above nature which has a crosslinked structure or a crosslinked and foamed structure only on its surface.

(3) Formed/Molded Product

The unsaturated copolymer according to the present invention per se can be manufactured into a formed or molded product, and the surface of a formed/molded product comprising an olefin-based resin can be coated partially or totally with a resin layer containing the unsaturated copolymer according to the present invention to manufacture a formed/molded product.

For preparing an olefin-based resin formed/molded product to be coated, various methods can be used without limitation. Examples of such a method are multi-layer extrusion molding method, the multi-layer blow molding method, the multi-layer injection molding method, and a method for laminating a coating film or sheet on the surface of a formed/molded product by means of heat or an adhesive.

A thickness of the coating layer in the polyolefin-based resin formed/molded product of the present invention is sufficient if it is of an order such that the base resin is not exposed at the surface. The coating layer thickness is ordinarily in the range of 0.1 pm to 10 cm, preferably in the range of 0.5 μm to 5 cm.

The formed/molded product thus obtained is, as in the case of the aforementioned laminate film, has the physical property characteristics of the olefin-based polymer of the base resin. It can further be endowed with properties, which are not exhibited in the olefin-based polymers and are primarily derived from polar groups, such as improved adhesion, paintability, printability, and antistatic properties. This is based on the fact that polar groups can be easily introduced on the surface of the laminated film by utilizing the reactivity of the carbon-carbon unsaturation in the side chain of the unsaturated copolymer resin comprised in the laminate as a coating resin. In addition, the unsaturated copolymer resin produces a crosslinked product or a crosslinked foam, so that only the surface of a molded product can be crosslinked or crosslinked and foamed.

(4) Surface Treatment

The laminated film or the formed/molded product thus obtained can be subjected to surface treatment with at least one of the compounds selected from the group consisting of ozone, a halonium compound, hydrogen peroxide, an organic peroxide, an organic peracid, sulfuric acid, nitric acid, nitrous acid, a thallium compound such as thallium (III) trifluoroacetate, a palladium (II) compound such as palladium (II) acetate, a manganese compound such as potassium permanganate, a chromium compound such as t-butyl chromate, tungstic acid, a cobalt compound such as a $\mu$-peroxocyanocobalt (III) complex, lead tetraacetate, a mercury (II) compound, osmium tetroxide, rhutenium tetroxide, selenium dioxide, halogenated acid compound such as potassium chlorate, and sodium periodate. Thus, a laminated film or a molded product having excellent surface properties such as adhesion, paintability, printability, and antistatic property can be obtained.

In this connection, when ozone treatment is carried out, hydrophilic property can be imparted to the surface of the laminated film or the formed/molded product before, during or after the ozone treatment by treating the surface with a compound selected from an amine compound, an amide compound, urea, polyethyleneimine and ammonia.

The term "halonium compound" as used herein means a compound which generates a halonium ion by itself or in an appropriate solvent, and particularly an element or a compound which produces a halonium ion or a hypohalous compound in the presence of an active hydrogen compound described hereinafter and is used together with the active hydrogen compound.

Specifically, a hypohalite such as sodium hypochlorite, an N-haloamide such as N-chloracetamide, or an N-haloimide such as N-chlorosuccinimide are particularly preferred. Examples of the active hydrogen compounds are water, ammonia, an alcohol, a phenol, a carboxylic acid, a mercaptan, a thiophenol, primary and secondary amines, an acid amide, and an N-monosubstituted amide.

(5) Painting

The surface of the laminated film or the formed/molded product obtained as described above can be coated with a paint curable through radical polymerization, which is then cured by heating, irradiation with light or the like to form the paint coating.

Specifically, there is an unsaturated polyester resin coating composition comprising an unsaturated polyester dissolved in a vinyl monomer containing a polymerization initiator. Examples of the vinyl monomer are styrene, (meth)acrylic acid esters, diallyl phthalate, and triallyl cyanurate. As the polymerization initiator, a variety of organic peroxides can be used.

Examples of the light setting paint to be applied as coating are compounds having light sensitive groups such as cinnamoyl and benzal acetophenone, among which polyfunctional acrylates having a polyester group, a polyether group, a polyurethane group or the like are particularly preferred. A light sensitizer such as benzoin can be incorporated into the paint according to necessity. For the light for curing, a high energy ionizing radiation having an energy of at least 100 keV, practically, electron rays or ultraviolet rays are ordinarily used.

(6) Crosslinked Product

The copolymer obtained according to the present invention or the composition comprising the copolymer and other thermoplastic polymers blended thereinto can be crosslinked.

Generally, the copolymers of propylene-based polymer resins are attracting much attention because of their excellent properties such as high rigidity, high melting point, gloss, transparence, and electric properties.

However, it is well known that a propylene polymer resin has a hydrogen atom bonded to the tertiary carbon atom in each monomer unit, and even when a radical crosslinking method with a peroxide or high energy electron rays adopted in the conventional crosslinking method of an ethylene polymer resin is applied to a propylene polymer resin, the cleavage reaction of the main molecular chain occurs preferentially to the crosslinking reaction, so that a desired crosslinked product may not be obtained whereby a highly foamed product or a deep drawing will not be obtained. Therefore, various methods for blending a crosslinking aid into the propylene polymer resin has been proposed. In this case, however, the crosslinking aid to be incorporated into the propylene polymer resin has a double bond in the main molecular chain or the tertiary carbon atoms in the main molecular chain is concurrently at the allyl position, so that the crosslinked product of the propylene polymer resin into which the aforementioned crosslinking aid has been incorporated is undesirably inferior in resistance to thermal deterioration, resistance to ozone, resistance to weathering or the like. Furthermore, most of the crosslinking aid is rubber in nature, so that the incorporation thereof into the propylene polymer resin inevitably leads to the lowering of mechanical properties such as stiffness and forces it to sacrifice its excellent properties.

On the other hand, the copolymer obtained according to the present invention, notwithstanding it being a propylene polymer resin, has a good crosslinking ability, and the crosslinked product obtained is the one which retains many characteristics inherent in the propylene polymer resin such as high stiffness, high melting point, gloss, transparence, and electric properties and has excellent resistance to thermal deterioration, resistance to ozone, resistance to weathering, deep drawing properties, high foamability and the like.

The copolymer obtained according to the present invention can crosslink not only a composition comprising the copolymer and a variety of thermoplastic resin, but also a composition comprising the copolymer and unsaturated rubbers such as natural rubber, polyisoprene rubber, polybutadiene rubber, ethylene-α-olefin-diene terpolymer rubber, and butyl rubber. In this connection, the unsaturated copolymer resin and an unsaturated rubber are crosslinked or cured with each other, so that a heat resistant rubber having a high stiffness and a high strength can be obtained.

It is another important characteristic of the crosslinked product according to the present invention that the copolymer according to the present invention can be modified owing to the unsaturation in the side chain of the unsaturated copolymer, so that the copolymer can be modified while partially leaving the unsaturation before crosslinking or it can also be modified owing to the unsaturation remaining on the surface after crosslinking to be endowed with properties such as adhesion, paintability, and printability which are derived from polar groups and have not been found in conventional polyolefins.

The copolymer obtained according to the present invention has a specific unsaturated group in the side chain, so that the conventional well known methods used for the crosslinking of unsaturated molecules such as an unsaturated rubber can be used. Examples of such methods are a method of using a free-radical generator, a method of using sulfur or a sulfur compound, a method of using radiation, the so-called resin crosslinking, and the quinoid crosslinking.

When the method of using a free-radical generator is used, the free-radical generator to be used is the so-called free-radical polymerization initiator including an organic peroxide such as a hydroperoxide, a dialkyl peroxide, a diacyl peroxide, or a peracid ester, an inorganic peroxide such as a persulfate, an azo compound, or a redox initiator.

As the crosslinking method, a conventional well known method is applied. Examples of such methods are a method of thermal melt blending the unsaturated copolymer resin, other thermoplastic polymers added according to necessity and a free-radical generator; a method of dissolving components in a solvent, heating the solution and then removing the solvent; and a method of dipping powder or a formed/molded product of the unsaturated copolymer resin or a polymer composition containing the unsaturated polymer resin into a solvent, heating the mixture and then removing the solvent.

When the method of using sulfur or a sulfur compound is used, the sulfur compound such as a sulfur halide, for example, sulfur monochloride can be used.

In the method of using radiation, γ-rays having radiation sources such as cobalt 60 and cesium 137, electron rays generated from an electron ray accelerator, X-rays generated from an X-ray generator, ultraviolet rays, proton rays, α-rays, β-rays, neutron rays or the like can be used. Among these radiations, γ-rays in which the steady supply of the radiation sources has been realized by the development of atomic force industry and electron rays which can be obtained in a high dose relatively inexpensively by the improvement of technology in the accelerator are preferably used.

The dose is ordinarily in the range of 0.01 to 100 Mrad, preferably in the range of 0.1 to 50 Mrad.

In the method of the resin crosslinking, a phenolic resin of which typical examples include an alkyl phenol resin and a bromoalkyl phenol resin is used as the crosslinking agent, and stannous chloride, a chlorosulfonated polyethylene or the like is used as the crosslinking catalyst.

In the case of quinoid crosslinking, there are, as the crosslinking agent, the combinations of p-quinone dioxime and lead dioxide or of p,p'-dibenzoylquinone dioxime and trilead tetroxide.

(7) Crosslinked Foam

The crosslinked product of the composition comprising the copolymer obtained according to the present invention can be formed into a good crosslinked foam by decomposing the chemical foaming agent simultaneously with or after crosslinking.

(8) Denaturation Treatment

The copolymer obtained according to the present invention has an unsaturation in the side chain, and thus various functional groups can be introduced into the polymer by the use of the reactivity of the unsaturation.

As a method for transforming the unsaturation into other functional groups, any of well known chemical reactions can be used. For instance, among such reactions are halogenation with a molecular halogen or a hydrogen halide; thiolation with hydrogen sulfide; epoxidation with a peroxide or a hydroperoxide; hydroxylation with dilute sulfuric acid, aqueous hydrogen peroxide, perchloric acid or the like; isocyanation with a halogenated isocyanate; cyanation with chlorosulfonyl isocyanate; hydroformylation; sulfonation with a variety of sulfonation agents; and addition of thiol compounds having a variety of functional groups. In addition, unsaturated acid anhydrides such as maleic anhydride or the like, unsaturated acids or esters thereof such as glycidyl methacrylate, 2-dimethylaminoethyl acrylate or the like, vinyl compounds such as styrene, vinyl acetate or the like, or vinyl compounds having special functional groups such as vinyl trimethoxysilane and tetramethylpiperazinyl acrylate can be grafted in the presence or absence of a free-radical generator. Furthermore, properties in higher levels can be imparted with the use of the reactivities of the various functional groups thus introduced. For example, it is possible to introduce hydrophilic amino or hydroxyl groups by reacting the epoxy group thus introduced with an amino compound and to react the grafted unsaturated acid anhydride with a compound having hydroxyl groups such as a polyethylene glycol monoether.

The denaturated polymers thus obtained are employed in various applications and are useful particularly in applications such as highly adherent materials, highly hydrophilic materials or compatibilizing agents of different types of polymers. [Experimental Examples]

The present invention will now be further and more specifically described with reference to the following Examples and Comparative Examples. These experimental examples were polymers prepared by the slurry polymerization method, but it should be understood that the present invention is not limited to these methods.

Test methods employed in the Examples and Comparative Examples are as follows.

(1) MFR (230° C., 2.16 kg): JIS K-6758 [g/10 min],
(2) Crystallinity: X-ray diffraction method,
(3) Melting point: DSC melting peak value [° C.],
(4) Monomer composition: $^1$H-NMR [molar %].

EXAMPLE 1

Preparation of Catalyst on Support

Into a 0.4-liter rotary ball mill which had been amply dried and purged with nitrogen were charged 40 stainless steel balls having a size of 12 mm, and 20 g of $MgCl_2$ and 8.8 ml of phthalic dichloride were introduced into the mill. Grinding was carried out in the rotary ball mill for 48 hours. After completion of grinding, the ground blend composition was taken out from the mill and placed in a dry box. A 8.8-g portion of the ground composition was then introduced into a flask which had been amply purged with nitrogen, and 25 ml of n-heptane and 25 ml of $TiCl_4$ were introduced into the flask. The reaction was conducted at 100° C. for 3 hours. After completion of the reaction, the mixture was thoroughly washed with n-heptane. A portion of the solid component [component (i)] obtained was taken out and subjected to composition analysis to give a Ti content of 3.01% by weight.

Next, into a flask which had been thoroughly purged with nitrogen were introduced 50 ml of amply purified n-heptane, 5 g of the component (i) obtained above and finally 1.1 ml of

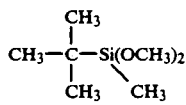

as a component (ii), and catalysis was conducted at 30° C. for 2 hours. After completion of the catalysis, washing with n-heptane was repeated amply to give a component (A).

Preparation of Copolymers

After an autoclave having a volume of 1 liter was purged with propylene, 260 ml of n-heptane was charged thereinto and 0.9 g of triethylaluminium and 0.16 g of the catalyst on support prepared in the same method as described above were added in this sequence. Then, after 110 Nml of hydrogen was added, propylene was injected, agitation was conducted at 50° C. and 0.5 kg/cm$^2$·G (gauge pressure) to obtain a polymer in a yield of 5.1 g. Then, 140 ml of 7-methyl-1,6-octadiene was added, and the temperature was raised while propylene was injected to conduct polymerization while the system was maintained at 65° C. and 5 kg/cm$^2$·G. After the catalyst was inactivated with n-butanol, the residual catalyst was extracted with water and the copolymer was collected by centrifugation and dried. The amount of the copolymer powder obtained was 178 g, and the bulk density was 0.46 g/cc.

The MFR of the copolymer was 3.1 g/10 min, and the melting peak according to DSC was 150° C. Upon $^1$H-NMR analysis, the content of 7-methyl-1,6-octadiene was found to be 3.9 mole %, and the copolymer had no chain of this diene monomer unit and had a 1,2-addition structure. The copolymer had a crystallinity of 34.5% according to the X-ray diffraction method, a molecular weight distribution according to GPC of 4.5 and no decalin insoluble portion at 135° C.

Furthermore, the solution obtained by centrifuging the copolymer slurry was concentrated to recover 7.9 g of an amorphous polymer.

EXAMPLE 2

Preparation of Catalyst on Support

Into a flask sufficiently purged with nitrogen was introduced 100 ml of a dehydrated and deoxygenated n-heptane, and then 0.1 mole of MgCl$_2$ and 0.20 mole of Ti(O-nBu)$_4$ were introduced into the flask to conduct a reaction at 100° C. for 2 hours. After completion of the reaction, the temperature was lowered to 40° C., and 15 ml of methyl hydrogen polysiloxane was introduced into the mixture to continue the reaction for a further 3 hours. After the reaction was completed, the solid component thus produced was washed with n-heptane and taken out in a small portion. A composition analysis of the solid component showed Ti=15.2% by weight and Mg=4.2% by weight. Into a flask which had been amply purged with nitrogen was introduced 100 ml of a dehydrated and deoxygenated n-heptane, and the component synthesized as described above was introduced in an amount of 0.03 mole in terms of Mg atom. A 0.05 mole portion of SiC14 was introduced at 30° C. over a period of 15 minutes, and reaction was conducted at 90° C. for 2 hours. After the reaction was completed, the mixture was washed with purified n-heptane. After 25 ml of n-heptane was mixed with 0.004 mole of o-C$_6$H$_4$(COCl)$_2$, and mixture was H 25 introduced at 50° C. A 0.05 mole portion of SiCl$_4$ was then introduced, and reaction was carried out at 90° C. for 2 hours. After the reaction was completed, the mixture was washed with n-heptane to give a catalyst component. The Ti content of the catalyst component was 2.05% by weight.

Preparation of Copolymer

After an autoclave having a volume of 1 liter was purged with propylene, 300 ml of n-heptane was charged thereinto and 0.9 g of triethylaluminium and 0.10 g of the catalyst on support prepared by the same method as described above were added in this sequence. Then, after 125 Nml of hydrogen was added, propylene was injected and agitation was conducted at 50° C. and 0.5 kg/cm$^2$·G to obtain a polymer in a yield of 3.1 g. Then, 100 ml of 7-methyl-1,6-octadiene was added, and the temperature was raised while propylene was injected to conduct polymerization while the system was maintained at 70° C. and 7 kg/cm$^2$·G. Then, by the same procedure as in Example 1, a dry powder was produced in an amount of 194 g. The bulk density was 0.50 g/cc.

The MFR of the copolymer was 3.5 g/10 min, and the melting peak according to DSC was 152.3° C. Upon $^1$H-NMR analysis, the content of 7-methyl-1,6-octadiene was found to be 2.6 mole %. The copolymer had no chain of this diene monomer unit and had a 1,2-addition structure. The copolymer had a crystallinity of 37.0% according to the X-ray diffraction method, a molecular weight distribution of 4.8 according to GPC and no decalin insoluble portion at 135° C.

In addition, the solution obtained by centrifuging the copolymer slurry was concentrated to recover 3.9 g of an amorphous polymer.

EXAMPLE 3

Copolymerization was conducted as in Example 2 except that 0.06 g of the catalyst on support and 100 ml were further added; propylene containing 3.0% by weight of ethylene was injected; and the polymerization was conducted at a temperature of 65° C. A dry powder was obtained in an amount of 182 g, and an amorphous polymer was obtained in an amount of 12.9 g.

The bulk density of the powder was 0.43 g/cc. The MFR of the copolymer was 2.8 g/10 min and the melting peak according to DSC was 131° C. The contents of 7-methyl-1,6-octadiene and ethylene were 2.4 mole % and 3.9 mole %, respectively. The copolymer was free of molecular chain of this diene monomer unit and had a 1,2-addition structure. The copolymer had a crystallinity of 30.2% according to the X-ray diffraction method, a molecular weight distribution of 5.5 according to GPC and no decalin insoluble portion at 135° C.

EXAMPLE 4

Copolymerization was conducted as in Example 3 except that the homopolymerization temperature of propylene was changed to 60° C.; the polymerization pressure was changed to 1.0 kg/cm²; and propylene containing 2.2% by weight of ethylene was used. A dry powder was obtained in an amount of 186 g, and an amorphous polymer was obtained in an amount of 6.7 g. In this connection, the yield of the propylene homopolymer was 7.8 g.

The bulk density of the powder was 0.49 g/cc. The MFR of the copolymer was 3.1 g/10 min, and the melting peak according to DSC was 138° C. The contents of 7-methyl-1,6-octadiene and ethylene were 2.0 mole % and 2.2 mole %, respectively. The copolymer was free of chain of this diene monomer unit and had a 1,2-addition structure. The copolymer had a crystallinity of 34% according to the X-ray diffraction method, a molecular weight distribution of 5.9 according to GPC and no decalin insoluble portion at 135° C.

COMPARATIVE EXAMPLE 1

After an autoclave having a volume of 1 liter had been purged with propylene, 260 ml of n-heptane and 140 ml of 7-methyl-1,6-octadiene were charged thereinto, and 0.9 g of triethylaluminium and 0.16 g of a catalyst on support prepared in Example 1 were added in this sequence. Then, 110 Nml of hydrogen was added, and the system was adjusted to a temperature of 65° C. Propylene was injected and maintained at a pressure of 5 kg/cm²·G, and polymerization was conducted. The catalyst was then inactivated with n-butanol, and the residual catalyst was extracted with water. The copolymer was then recovered by centrifugation and dried. The yield of the copolymer powder obtained was 165 g, and the bulk density of the powder was 0.39 g/cc. The yield of the amorphous polymer was 12.5 g.

The MFR of the copolymer was 2.3 g/10 min and the melting peak according to DSC was 151° C. The content of 7-methyl-1,6-octadiene was 3.7 mole %. The copolymer had no decalin insoluble portion at 135° C.

COMPARATIVE EXAMPLE 2

Copolymerization was conducted as in Example 1 except that n-heptane in an amount of 400 ml in place of 260 ml was used, and 40 ml of 1,5-octadiene was used in place of 140 ml of 7-methyl-1,6-octadiene. The yield of the copolymer powder obtained was 4.8 g, and the yield of the amorphous polymer was 2.1 g.

The MFR of the copolymer was 11 g/10 min and the content of 1,5-octadiene was 0.7 molar %. The copolymer had a decalin insoluble portion at 135° C. in an amount of 0.02%.

COMPARATIVE EXAMPLE 3

Copolymerization was conducted as in Comparative Example 1 except that n-heptane in an amount of 400 ml in place of 260 ml was used, and 40 ml of 1,5-octadiene was used in place of 140 ml of 7-methyl-1,6-octadiene. The yield of the copolymer powder obtained was 3.7 g, and the yield of the amorphous polymer was 2.3 g.

The MFR of the copolymer was 13 g/10 min and the content of 1,5-octadiene was 0.8 molar %. The copolymer had a decalin insoluble portion at 135° C. in an amount of 0.9%.

I claim:

1. In a process for preparing an unsaturated copolymer by the copolymerization of propylene and the branched diene which is 6-methyl-1,6-octadiene and/or 7-methyl-1,6-octadiene, and optionally, ethylene, the improvement which comprises, in a first polymerization step, the polymerization of propylene over a catalyst conducted in the presence of neither ethylene, 6-methyl-1,6-octadiene nor 7-methyl-1,6-octadiene until the propylene polymer amounts to 0.01 to 10% by weight of the total copolymer to be produced, and, in a second polymerization step, the random copolymerization of propylene, 6-methyl-1,6-octadiene and/or 7-methyl-1,6-octadiene, and optionally, ethylene conducted in the presence of said propylene polymer produced in the first polymerization step and at least a part of the activity of the catalyst used in the first polymerization step to produce a copolymer defined as follows:

(1) essentially consisting of the components of
(a) 84 to 99.5 mole % of a unit derived from propylene,
(b) 0 to 15 mole % of a unit derived from ethylene, and
(c) 0.5 to 15 mole % of a unit derived from 6-methyl-1,6-octadiene and/or 7-methyl-1,6-octadiene;
(2) soluble in decalin at 135° C. and substantially free of gel of a crosslinked polymer; and
(3) having a MFR (at 230° C. under a load of 2.16 kg) of 0.01 to 500 g/10 min.

2. A process according to claim 1, wherein the polymerization in the first step, polymerization of propylene is conducted until the propylene polymer amounts to 0.1 to 7% by weight of the total copolymer to be produced.

3. A process according to claim 1, wherein the polymerization in the first step, polymerization of propylene is conducted until the propylene polymer amounts to 0.5 to 5% by weight of the total copolymer to be produced.

4. A process according to claim 1, wherein the polymerization in the first step is conducted at a temperature which is in the range of 0 to 95° C. and is not higher than the temperature of polymerization in the second step which succeeds the polymerization in the first step.

5. A process according to claim 1, wherein the polymerization in the second step is conducted at a temperature in the range of 30 to 100° C.

6. A process according to claim 1, wherein the polymerization in the second step is conducted at a temperature in the range of 40 to 90° C.

7. A process according to claim 1, wherein the branched 1,6-diene to be copolymerized in the polymerization in the second step is substantially one of 6- and 7-methyl-1,6-octadienes.

8. A process according to claim 1, wherein the branched 1,6-diene to be copolymerized in the polymerization in the second step is solely 7-methyl-1,6octadiene.

9. A process according to claim 1, wherein the unsaturated copolymer produced contains 87 to 99.5 mole % of the propylene unit, 0 to 12 mole % of the ethylene unit and 0.5 to 10 mole % of the branched 1,6-diene unit.

10. A process according to claim 1, wherein the unsaturated copolymer produced contains 90 to 99 mole % of the propylene unit, 0 to 10 mole % of the ethylene unit and 1 to 6 mole % of the branched 1,6-diene unit.

11. A process according to claim 1, wherein the unsaturated copolymer produced has a melting point as the melting peak temperature according to DSC in the range of 100 to 160° C.

* * * * *